(12) United States Patent
Okazawa et al.

(10) Patent No.: US 11,270,191 B2
(45) Date of Patent: Mar. 8, 2022

(54) ON-CHIP POISSON SPIKE GENERATION

(71) Applicant: INTERNATIONAL BUSINESS MACHINES CORPORATION, Armonk, NY (US)

(72) Inventors: Junka Okazawa, Yamashina-ku (JP); Masatoshi Ishii, Yokohama (JP); Atsuya Okazaki, Tokyo (JP); Kohji Hosokawa, Ohtsu (JP)

(73) Assignee: International Business Machines Corporation, Armonk, NY (US)

( * ) Notice: Subject to any disclaimer, the term of this patent is extended or adjusted under 35 U.S.C. 154(b) by 851 days.

(21) Appl. No.: 16/116,280

(22) Filed: Aug. 29, 2018

(65) Prior Publication Data

US 2020/0074272 A1 Mar. 5, 2020

(51) Int. Cl.
| | | |
|---|---|---|
| *G06N 3/04* | (2006.01) | |
| *G06N 3/08* | (2006.01) | |
| *G06N 3/063* | (2006.01) | |

(52) U.S. Cl.
CPC ........... *G06N 3/049* (2013.01); *G06N 3/0635* (2013.01); *G06N 3/08* (2013.01)

(58) Field of Classification Search
CPC ......... G06N 3/049; G06N 3/0635; G06N 3/08
See application file for complete search history.

(56) References Cited

U.S. PATENT DOCUMENTS

| | | | | |
|---|---|---|---|---|
| 10,552,731 | B2* | 2/2020 | Yasuda | G06N 3/088 |
| 10,762,419 | B2* | 9/2020 | Yasuda | G06N 3/063 |
| 2012/0109866 | A1* | 5/2012 | Modha | G06N 3/088 |
| | | | | 706/28 |
| 2012/0259804 | A1* | 10/2012 | Brezzo | G06N 3/063 |
| | | | | 706/25 |
| 2013/0031040 | A1* | 1/2013 | Modha | G06N 3/049 |
| | | | | 706/27 |
| 2013/0073497 | A1 | 3/2013 | Akopyan et al. | |
| 2015/0347870 | A1* | 12/2015 | Andreopoulos | G06K 9/4661 |
| | | | | 382/190 |
| 2017/0200079 | A1 | 7/2017 | Amir et al. | |

OTHER PUBLICATIONS

Albada et al., "Performance Comparison of the Digital Neuromorphic Hardware SpiNNaker and the Neural Network Simulation Software NEST for Full-Scale Cortical Microcircuit Model", May 23, 2018, Frontiers in Neuroscience, pp. 1-20. (Year: 2018).*

(Continued)

*Primary Examiner* — Paulinho E Smith
(74) *Attorney, Agent, or Firm* — Tutunjian & Bitetto, P.C.; Randall Bluestone (57) ABSTRACT

A spiking neural network device including a spiking neural network circuit including a crossbar array of plural synapses; plural axons connected with the spiking neural network circuit, the plural axons receiving input of a spike signal; and plural Poisson spike generators respectively provided for the plural axons. Each Poisson spike generator can be set whether or not to emit the spike signal based on an input signal to be processed, and each Poisson spike generator can, be set to emit the spike signal being configured to generate a Poisson spike train different from each other. and supply the Poisson spike train to a corresponding one of the plural axons.

10 Claims, 8 Drawing Sheets

(56) References Cited

OTHER PUBLICATIONS

Tikidji-Hamburyan et al., "Software for Brain Network Simulations: A Comparative Study", Jul. 20, 2017, Frontiers in Neuroinformatics, pp. 1-16. (Year: 2017).*
Neftci, Emre, et al. "Event-driven contrastive divergence for spiking neuromorphic systems." Frontiers in neuroscience, Jan. 2014, 14 pages, 7, 272.
Cameron, Katherine, et al. "Poisson distributed noise generation for spiking neural applications." Circuits and Systems (ISCAS), Proceedings of 2010 IEEE International Symposium on, IEEE, May 2010, pp. 365-368.
Kim, S., et al. "NVM neuromorphic core with 64k-cell (256-by-256) phase change memory synaptic array with on-chip neuron circuits for continuous in-situ learning." Electron Devices Meeting (IEDM), 2015 IEEE International. IEEE, Dec. 2015, pp. 17.1.1-17.1.4.

* cited by examiner

ON-CHIP POISSON SPIKE GENERATION

BACKGROUND

Technical Field

The present invention relates to on-chip Poisson spike generation.

SUMMARY

According to an embodiment of the present invention, a spiking neural network device is provided that includes a spiking neural network circuit, plural axons connected with the spiking neural network circuit, and plural Poisson spike generators respectively provided for the plural axons. The spiking neural network circuit includes a crossbar array of plural synapses. The plural axons receive input of a spike signal. Each Poisson spike generator is configured to be set whether or not to emit the spike signal based on an input signal to be processed. Each Poisson spike generator set to emit the spike signal is configured to generate a Poisson spike train different from each other and supply the Poisson spike train to a corresponding one of the plural axons.

According to another embodiment of the present invention, an on-chip Poisson spike generator is provided for a spiking neural network device. The on-chip Poisson spike generator is individually provided for each of plural axons connected with a spiking neural network circuit including a crossbar array of plural synapses. The on-chip Poisson spike generator includes an AND circuit and an enable register. The AND circuit is configured to receive a random bit stream and an external trigger. The random bit stream is a binary signal whose value becomes High with a certain probability, and the external trigger is a random spike train in which a spike occurs with another certain probability different from the certain probability. The AND circuit is configured to generate a spike train. The enable register is configured to enable the on-chip Poisson spike generator to emit the spike train generated by the AND circuit or disable the on-chip Poisson spike generator from emitting the spike train, based on an input signal to be processed.

According to yet another embodiment of the present invention, a method is provided for emitting a Poisson spike train from a spiking neural network device. The spiking neural network device includes: a spiking neural network circuit including a crossbar array of plural synapses; and plural Poisson spike generators respectively provided for plural axons connected with the spiking neural network circuit. Each Poisson spike generator is configured to generate a Poisson spike train different from each other and supply the Poisson spike train to a corresponding one of the plural axons. Each Poisson spike generator is configured to calculate an AND of a random bit stream, which is a random binary signal whose value becomes High at a certain probability, and an external trigger, which is a random spike train in which a spike occurs with a certain probability, to generate the Poisson spike train. Each Poisson spike generator includes an enable register configured to enable or disable emission of the generated Poisson spike train. The method includes inputting the random bit stream and a shift clock to a shift register of each Poisson spike generator corresponding to one of the plural axons one after another, thereby inputting the random bit stream to the shift registers of all Poisson spike generators while shifting the random bit stream by one clock of the shift clock for each Poisson spike generator in order of inputting. The method further includes enabling each Poisson spike generator to emit the Poisson spike train or disabling each Poisson spike generator from emitting the Poisson spike train by setting the enable register of each Poisson spike generator based on an input signal pattern

DETAILED DESCRIPTION

Hereinafter, exemplary embodiments of the present invention will be described in detail with reference to the attached drawings.

It is to be noted that the present invention is not limited to these exemplary embodiments to be given below and may be implemented with various modifications within the scope of the present invention. In addition, the drawings used herein are for purposes of illustration, and may not show actual dimensions.

A spiking neural network (SNN) is a type of neural network model. Further, an event-driven restricted Boltzmann machine (eRBM) is a type of SNN model.

A Poisson spike train is input to the eRBM for training and inference. The Poisson spike train refers to a spike train in the Poisson spike model, which generates spikes with a certain probability. In the Poisson spike model, intervals between spikes follow the Poisson distribution. That is, in the Poisson spike model, when a signal pattern representing an input image (hereinafter referred to as the "input signal pattern") as one training data or one inference data is input, a number of spikes (a Poisson spike train) are input to the same axon based on this input signal pattern.

In one example of conventional hardware implementation of the SNN, an external chip may generate and input a Poisson spike train to an SNN chip. Examples of the external chip include a central processing unit (CPU), an application specific integrated circuit (ASIC) and a field-programmable gate array (FPGA). In this implementation, spikes constituting an input signal pattern of an image are input to the SNN chip many times, which increases a power (I/O power) and a bandwidth required for inputting/outputting signals to/from the SNN chip.

Figure 1:
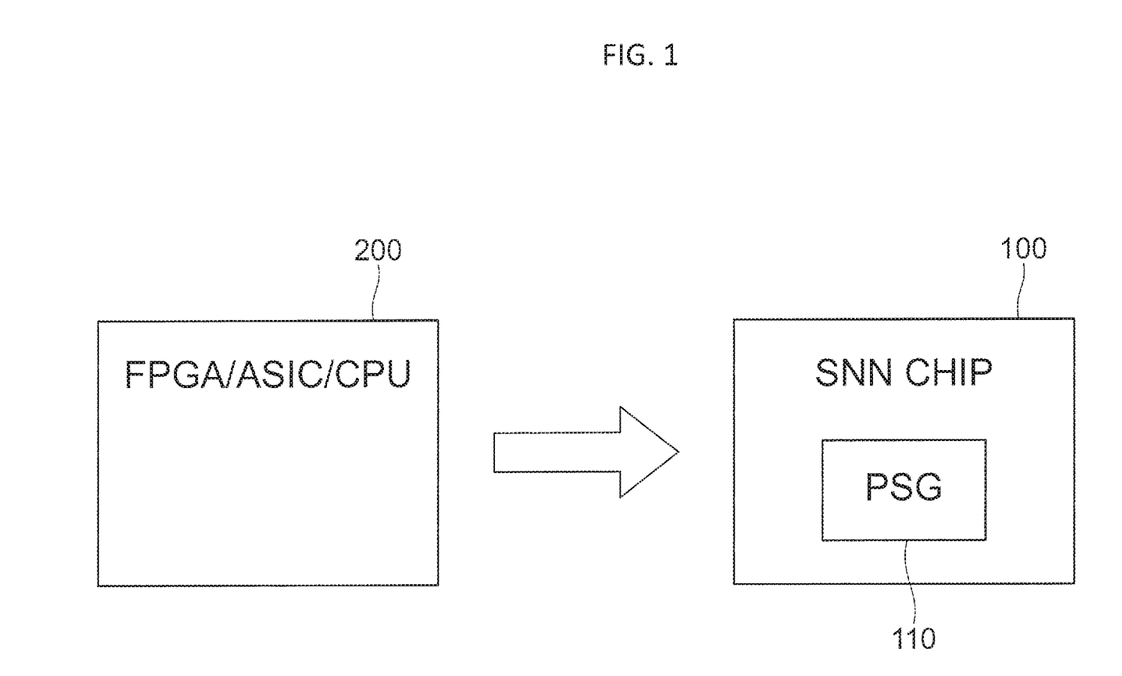
FIG. 1 is a conceptual diagram of an SNN chip according to exemplary embodiments of the present invention.

FIG. 1 is a conceptual diagram of an SNN chip according to exemplary embodiments of the present invention.

To reduce a power (I/O power) and a bandwidth required for inputting/outputting signals to/from an SNN chip of the eRBM, a Poisson spike generator (PSG) 110 may be implemented on the SNN chip 100, as shown in FIG. 1. In this implementation, an input signal pattern as one training data or one inference data is transmitted from an external chip 200 to the SNN chip 100 only once. In other words, this eliminates the need for transmitting a number of spikes (a Poisson spike train) from the external chip 200 to the SNN chip 100 based on the input signal pattern.

In the SNN chip 100, each axon receives input of a Poisson spike train according to the input signal pattern. Accordingly, when implementing the PSG 110 on the SNN chip 100, the PSG 110 needs to be individually provided for each axon. For example, the PSG 110 implemented on the SNN chip 100 may be configured as follows.

Figure 2:
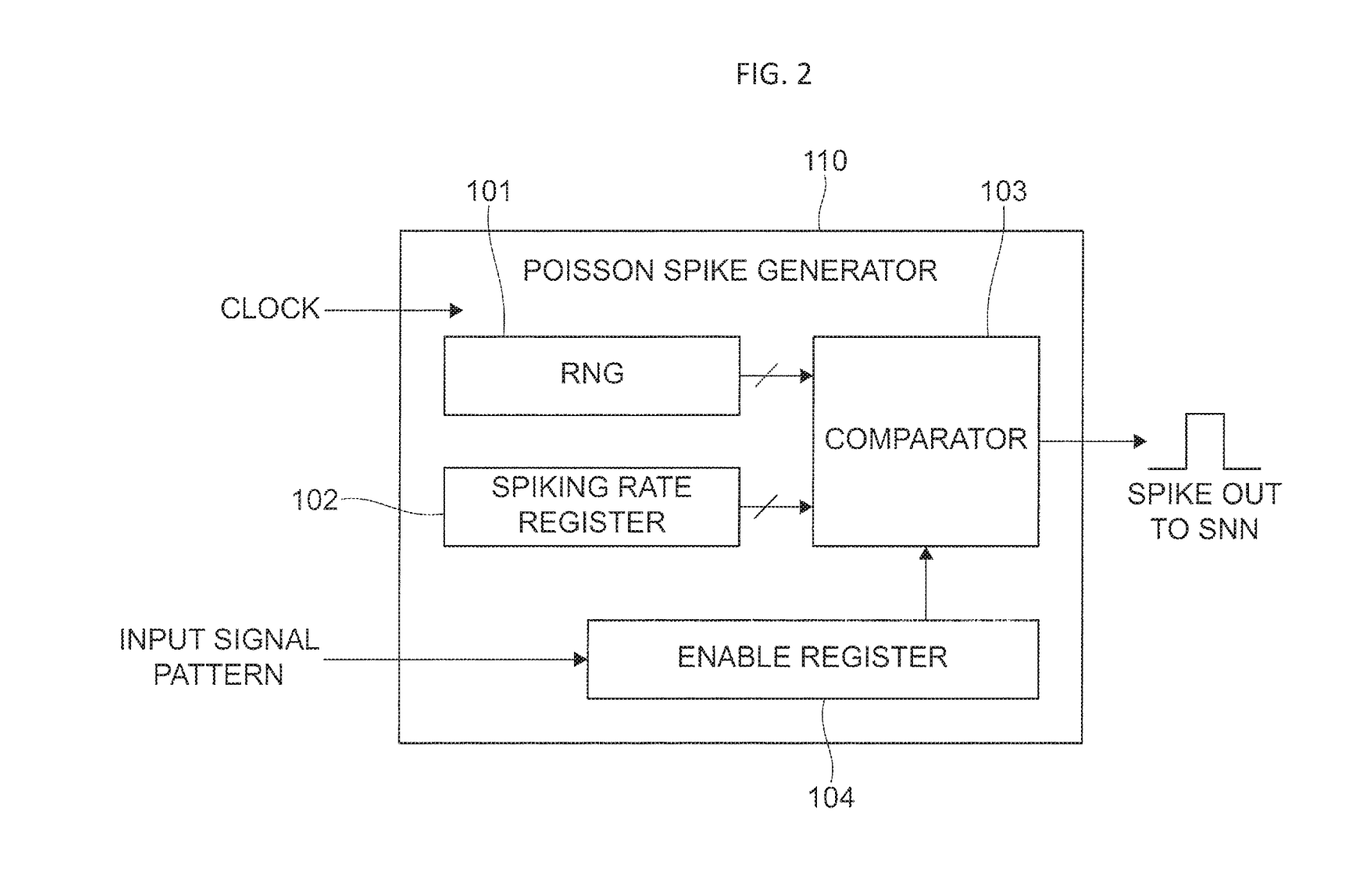
FIG. 2 illustrates a PSG implemented on an SNN chip according to an embodiment of the present invention.

FIG. 2 illustrates the PSG 110 implemented on the SNN chip 100 (FIG. 1) according to an embodiment of the present invention.

The PSG 110 shown in FIG. 2 includes a random number generator (RNG) 101, a spiking rate register 102, a comparator 103 and an enable register 104.

The RNG 101 generates random numbers according to clock signals input to the PSG 110.

The spiking rate register 102 stores a comparison value to be compared with the random numbers generated by the RNG 101. The comparison value determines the probability of a spike occurring in a Poisson spike train.

The comparator 103 compares each random number generated by the RNG 101 with the comparison value read from the spiking rate register 102. Based on the comparison result, the comparator 103 emits a spike according to a setting of the enable register 104.

The enable register 104 enables the PSG 110 to emit a spike or disables the PSG 110 from emitting a spike, according to an input signal pattern. When the enable register 104 of a PSG 110 is set to OFF, the PSG 110 does not emit a spike regardless of operations of the RNG 101, the spiking rate register 102 and the comparator 103. On the other hand, when the enable register 104 of a PSG 110 is set to ON, the PSG 110 emits a spike train, which follows the Poisson distribution, based on operations of the RNG 101, the spiking rate register 102 and the comparator 103. This spike train is supplied to the axon corresponding to this PSG 110. In the present embodiment, to set the enable register 104, an input signal pattern is transmitted to the SNN chip 100 only once. This allows to reduce a power (I/O power) and a bandwidth required for inputting/outputting signals to/from the SNN chip 100.

In the configuration shown in FIG. 2, the PSG 110 is individually provided for each axon of the SNN chip 100. Accordingly, as many RNGs 101 as the number of axons are provided on the SNN chip 100. Here, the RNG 101 is typically larger than other elements (the spiking rate register 102, the comparator 103 and the enable register 104) on the SNN chip 100. Further, plural bundles of wires are used for connection between the RNG 101 and the comparator 103 and between the spiking rate register 102 and the comparator 103. This increases the size of the PSG 110 shown in FIG. 2. Thus, the SNN chip 100 with this PSG 110 provided for each axon leaves room for improvement in terms of area-efficiency.

Figure 3:
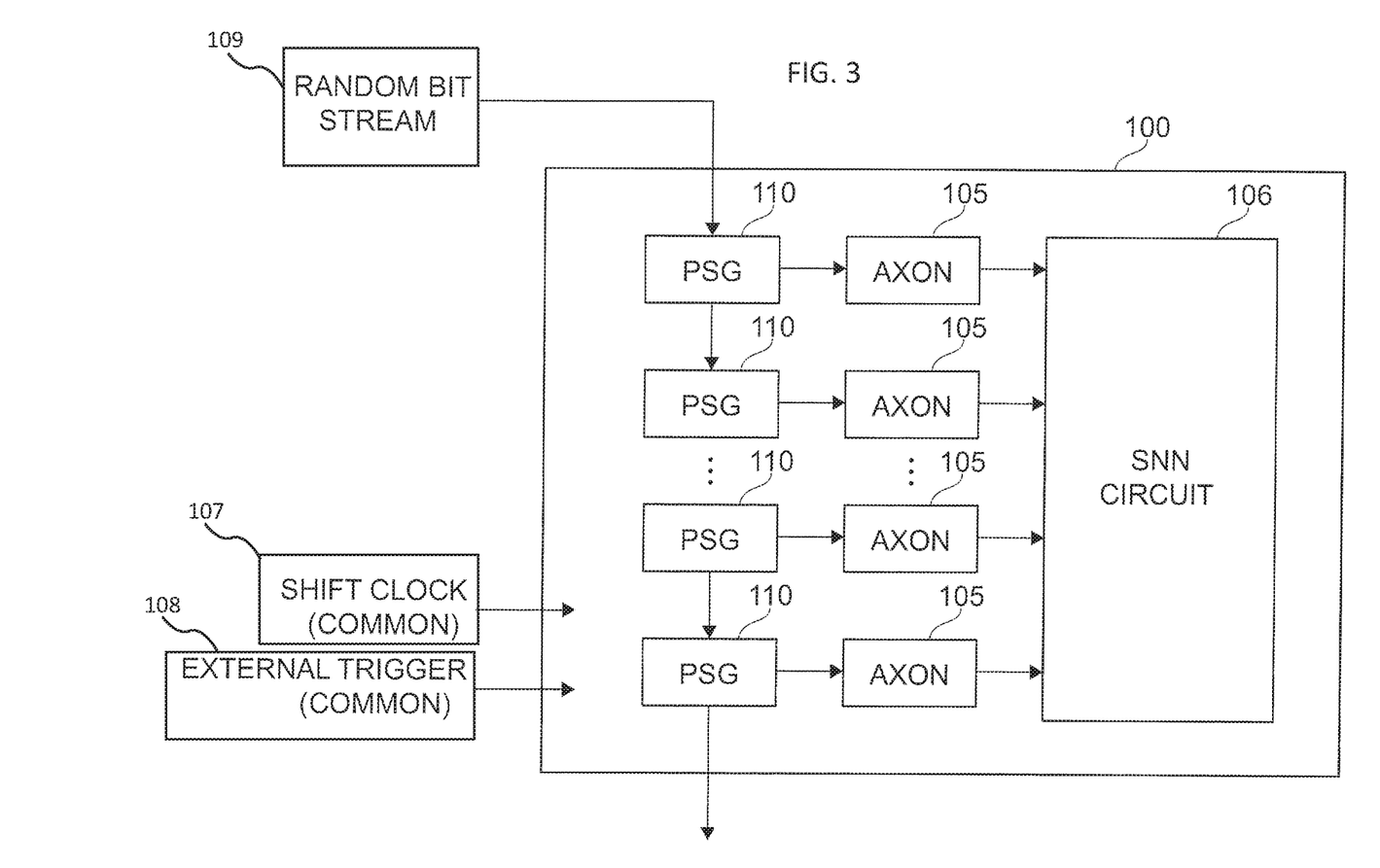
FIG. 3 illustrates the SNN chip according to an embodiment of the present invention.

FIG. 3 illustrates the SNN chip 100 according to an embodiment of the present invention.

The present embodiment employs the PSG 110 with a different configuration from that of the embodiment shown in FIG. 2. The PSG 110 of the present embodiment improves the area-efficiency of the SNN chip 100 as compared to the PSG 110 of the embodiment shown in FIG. 2.

On the SNN chip 100 shown in FIG. 3, plural axons 105 are provided for an SNN circuit 106, and one PSG 110 is provided for each axon 105. The SNN circuit 106 includes a crossbar array of plural synapses, which are connected in series with plural axon lines (axons 105) and connected in series with plural dendrite lines to form the crossbar array. Each PSG 110 receives input of a common shift clock 107 and a common external trigger 108. Also, one random bit stream 109 is transmitted to each PSG 110 while being shifted by one clock at a time by the shift clock 107. The random bit stream 109, the shift clock 107 and the external trigger 108 are supplied from outside of the SNN chip 100. Details of these signals will be described later.

Figure 4:
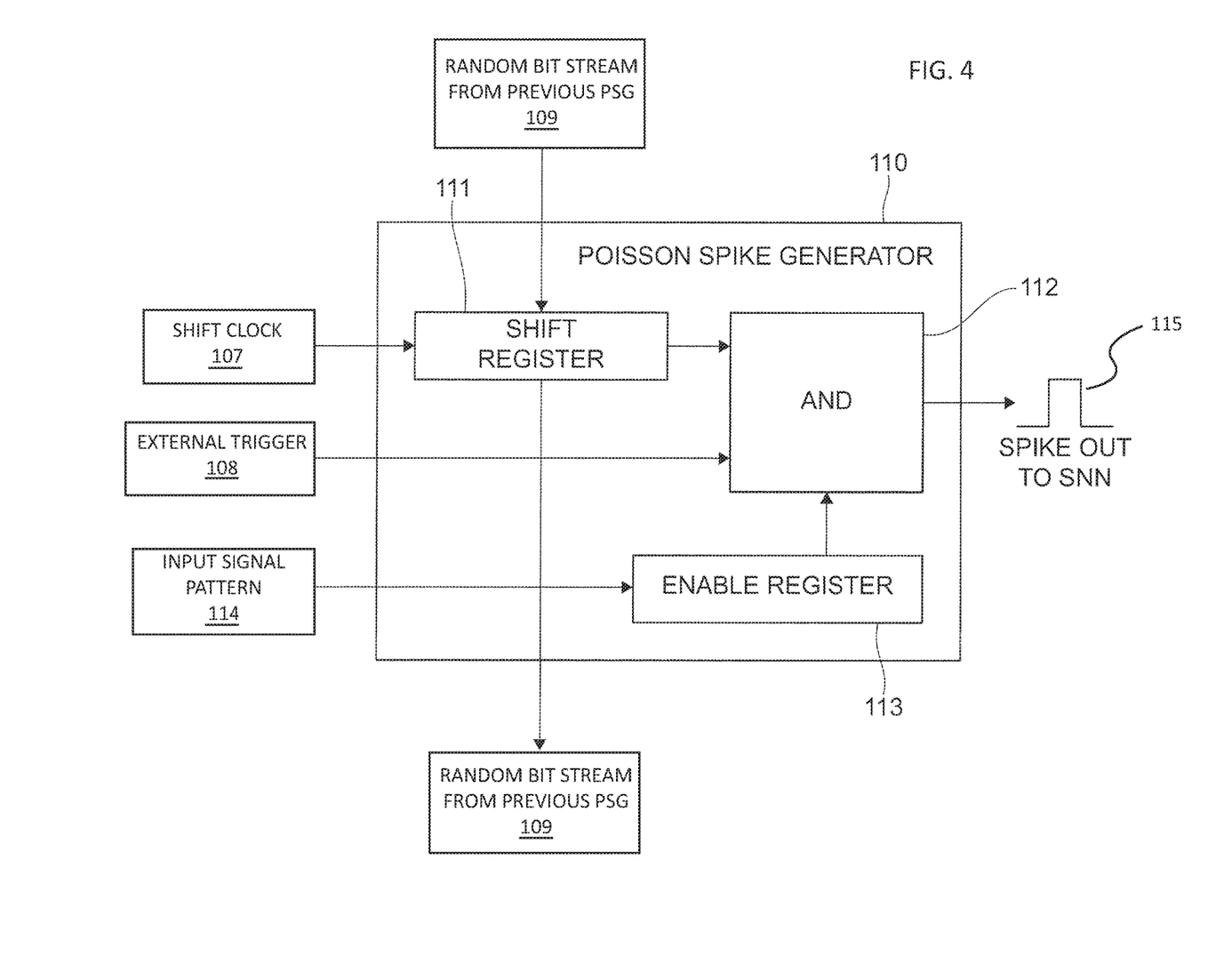
FIG. 4 illustrates an exemplary configuration of the PSG shown in FIG. 3.

FIG. 4 illustrates an exemplary configuration of the PSG 110 shown in FIG. 3.

The PSG 110 shown in FIG. 4 includes a shift register 111, an AND circuit 112, and an enable register 113.

The shift register 111 receives input of the random bit stream 109 and the shift clock 107. The random bit stream 109 is first supplied from an external source to a destination PSG 110 on the SNN chip 100 (FIG. 3), and then supplied to another PSG 110 from a prior PSG 110 in turn. That is, the random bit stream 109 is supplied to the PSGs 110 on the SNN chip 100 one after another in a bucket-brigade manner. Referring to FIG. 3, the PSG 110 located uppermost in the figure receives the random bit stream 109 from an external source, and other PSGs 110 receive the random bit stream 109 each from an upper neighboring PSG 110.

The shift register 111 delays the received random bit stream 109 by one clock of the shift clock 107 before transmitting it to the AND circuit 120 and the next PSG 110. The next PSG 110 refers to a lower neighboring PSG 110 in the example shown in FIG. 3. Since the shift register 111 of each PSG 110 transmits the random bit stream 109 while delaying it by one clock of the shift clock 107, a different bit pattern is input to each PSG 110.

The AND circuit 112 calculates an AND of the random bit stream 109 fed from the shift register 111 and the external trigger 108 according to the setting of the enable register 113 and emits a spike signal. The external trigger 108 is input to the PSGs 110 in common, but the random bit stream 109 is input to the PSGs 110 each as a different signal as described above. Accordingly, the PSGs 110 emit signals different from each other.

The enable register 113 enables the PSG 110 to emit a spike or disables the PSG 110 from emitting a spike, according to an input signal pattern 114, similarly to the enable register 104 explained with reference to FIG. 2. Accordingly, when the enable register 113 of a PSG 110 is set to OFF, the PSG 110 does not emit a spike regardless of operations of the shift register 111 and the AND circuit 112. On the other hand, when the enable register 113 of a PSG 110 is set to ON, the PSG 110 emits a spike train 115, which follows the Poisson distribution, based on operations of the shift register 111 and the AND circuit 112. This spike train 115 is supplied to the axon 105 corresponding to this PSG 110.

Figure 5:
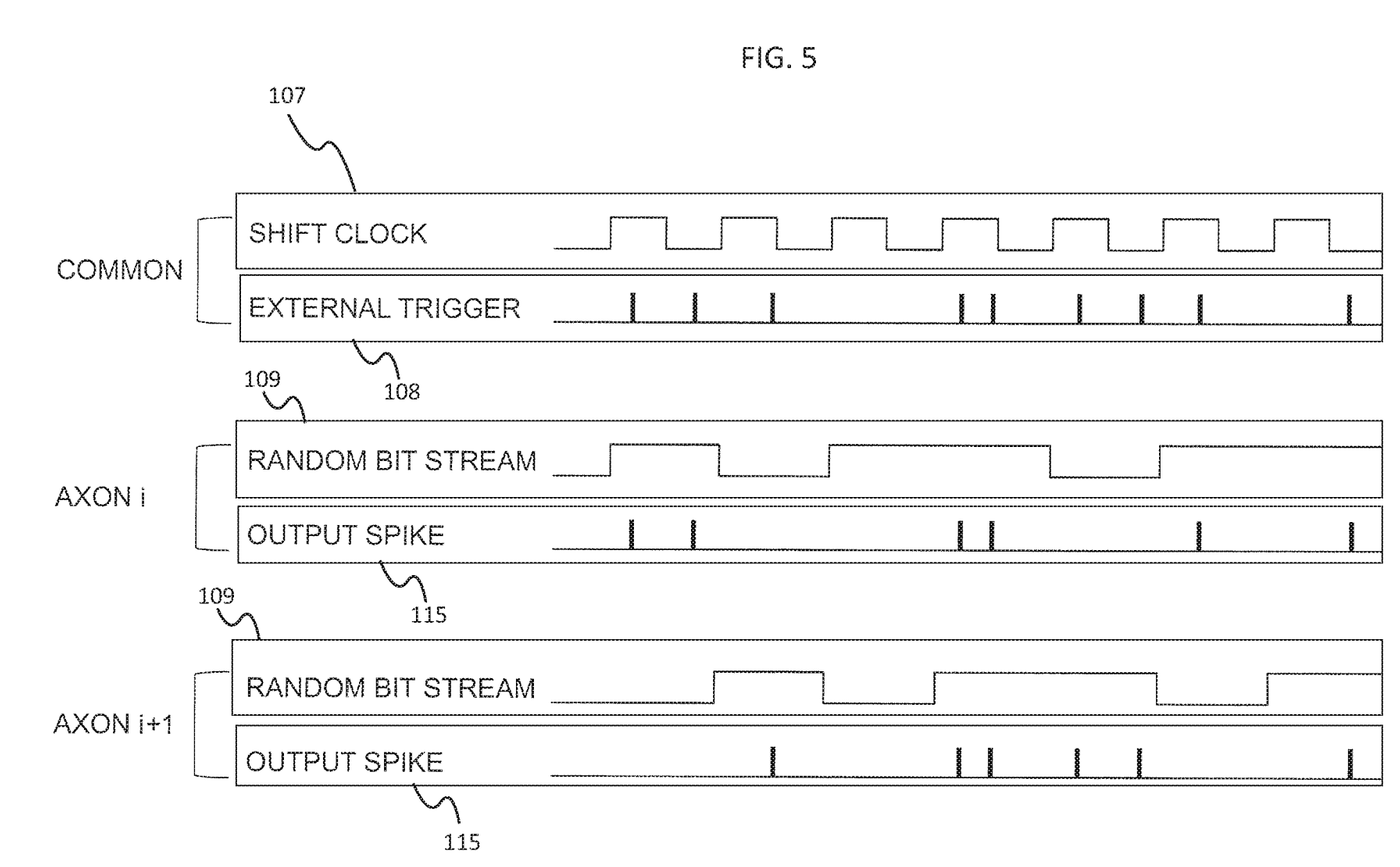
FIG. 5 illustrates relationship among a shift clock, an external trigger, a random bit stream and outputs (output spikes) from the PSGs.

FIG. 5 illustrates relationship among the shift clock 107, the external trigger 108, the random bit stream 109 and outputs (output spikes 115) from the PSGs 110. FIG. 5 shows the random bit stream 109 and output spikes 115 regarding the PSG 110 corresponding to the i-th axon 105 and the PSG 110 corresponding to the (i+1)-th axon 105. In FIG. 5, the random bit stream 109 for each PSG 110 is one received by the AND circuit 112 of each PSG 110, namely the random bit stream 109 having undergone the shifting process by the shift register 111.

In FIG. 5, the shift clock 107 is a clock signal. Frequency of the shift clock 107 is not limited to a particular frequency.

The external trigger 108 is a random Poisson spike train including spikes occurring with a certain probability. The probability of a spike occurring in the external trigger 108 is determined based on relationship with the probability of an output spike 115 occurring and the random bit stream 109.

The random bit stream 109 is a random binary signal whose value becomes High (value "1") with a certain probability. The probability of the value of the random bit stream 109 becoming High is determined based on relationship with the probability of an output spike 115 occurring and the external trigger 108.

Output spikes 115 are spikes emitted from the PSG 110. Output spikes 115 constitute a Poisson spike train.

The shift clock 107 and the external trigger 108 are common signals and supplied to the PSGs 110 in common. On the other hand, comparing the random bit stream 109 fed to the PSG 110 corresponding to the i-th axon 105 and the random bit stream 109 fed to the PSG 110 corresponding to the (i+1)-th axon 105, the latter is shifted (delayed) from the former by one clock of the shift clock 107. Output spikes 115 from the PSG 110 correspond to an AND of the random bit stream 109 and the external trigger 108. Therefore, as shown in FIG. 5, spikes corresponding to those in the external trigger 108 when the random bit stream 109 fed to the PSG 110 is High are emitted as output spikes 115. As a result, a spike train of output spikes 115 from the PSG 110 corresponding to the i-th axon 105 differs from a spike train of output spikes 115 from the PSG 110 corresponding to the (i+1)-th axon 105.

Here, the probability of an output spike 115 occurring will be explained. Let a required probability of an output spike 115 (e.g., a spike train supplied to the axon 105) being emitted from the PSG 110 be E. As described above, output spikes 115 are obtained from an AND of the random bit stream 109 and the external trigger 108. Thus, when the probability of the signal of the random bit stream 109 being High is E/N and the probability of a spike occurring in the external trigger 108 is E×N, then the probability of an output spike 115 occurring will be E. Note that N is a value larger than "1".

In this way, the present embodiment allows inputting of random Poisson spike trains to respective axons 105 on the SNN chip 100 (FIG. 3) according to the setting of the enable register 113 based on the input signal pattern 114. Further, the PSG 110 provided for each axon 105 consists of one shift register 111, one AND circuit 112 and one enable register 104, and this may reduce the size of the PSG 110 as compared to the embodiment shown in FIG. 2, which uses the RNG 101.

Operation of the SNN chip 100 (FIG. 3) of the present embodiment executing a process will be explained.

Figure 6:
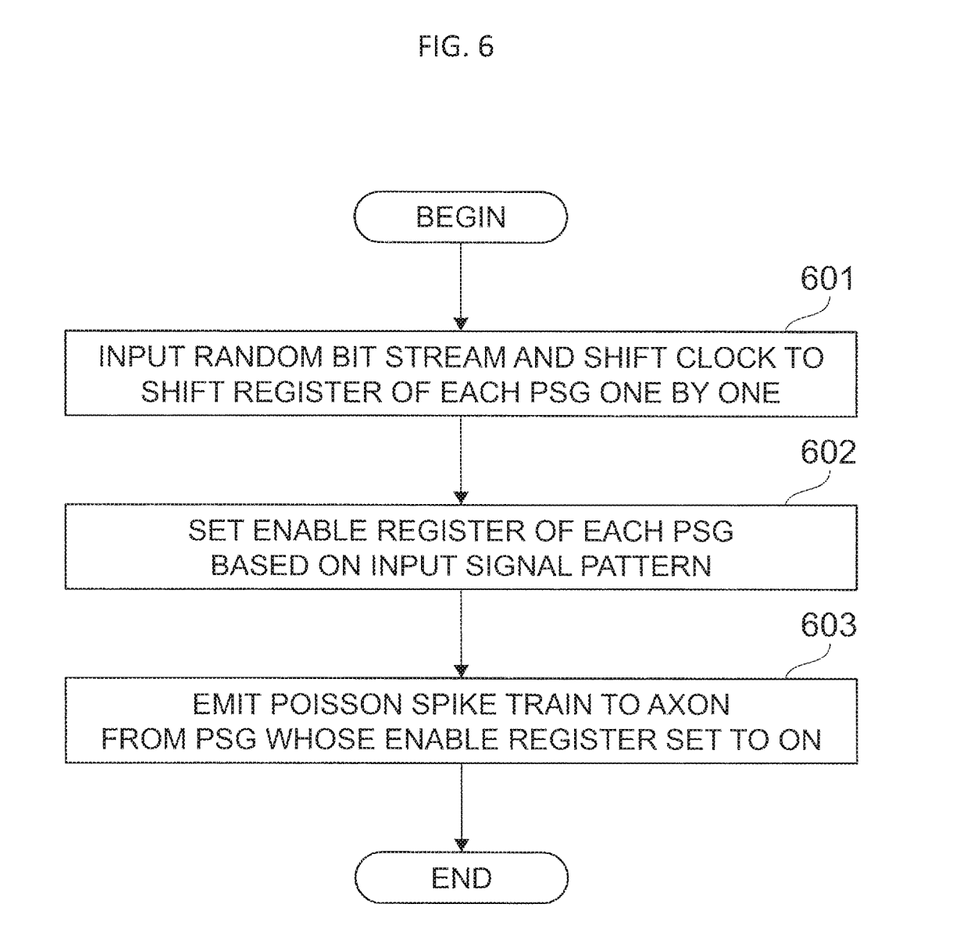
FIG. 6 is a flowchart illustrating an operation of the SNN chip.

FIG. 6 is a flowchart illustrating an operation of the SNN chip 100.

The enable register 104 of each PSG 110 is initially set of OFF, whereby a Poisson spike train is not supplied to any of the axons 105.

When training or inference is performed using the SNN chip 100, first, the random bit stream 109 and the shift clock 107 are input to the shift register 111 of each PSG 110 on the SNN chip 100 one by one, at block S601. Specifically, after a lapse of time during which the shift clock 107 is input to all axons 105 on the SNN chip 100, the random bit stream 109 is input to the shift registers 111 of all PSGs 110 while being shifted by one clock of the shift clock 107 for each shift register 111 in the order of inputting.

Then, the enable register 104 of each PSG 110 is set based on the input signal pattern 114 at block S602. This enables some PSGs 110 to emit a Poisson spike train and disables other PSGs 110 from emitting a Poisson spike train. In other words, some axons 105 are set to receive a Poisson spike train and other axons 105 are set not to receive a Poisson spike train. In this way, the PSGs 110 whose enable register 104 set to ON emit a Poisson spike train to respective axons 105 at block S603.

Next, another embodiment of the present invention will be explained with reference to FIG. 7.

In the embodiment shown in FIGS. 3 and 4, the spike train of the external trigger 108 is supplied from an external source. However, a Poisson spike train corresponding to the external trigger 108 may be generated by the SNN chip 100.

Figure 7:
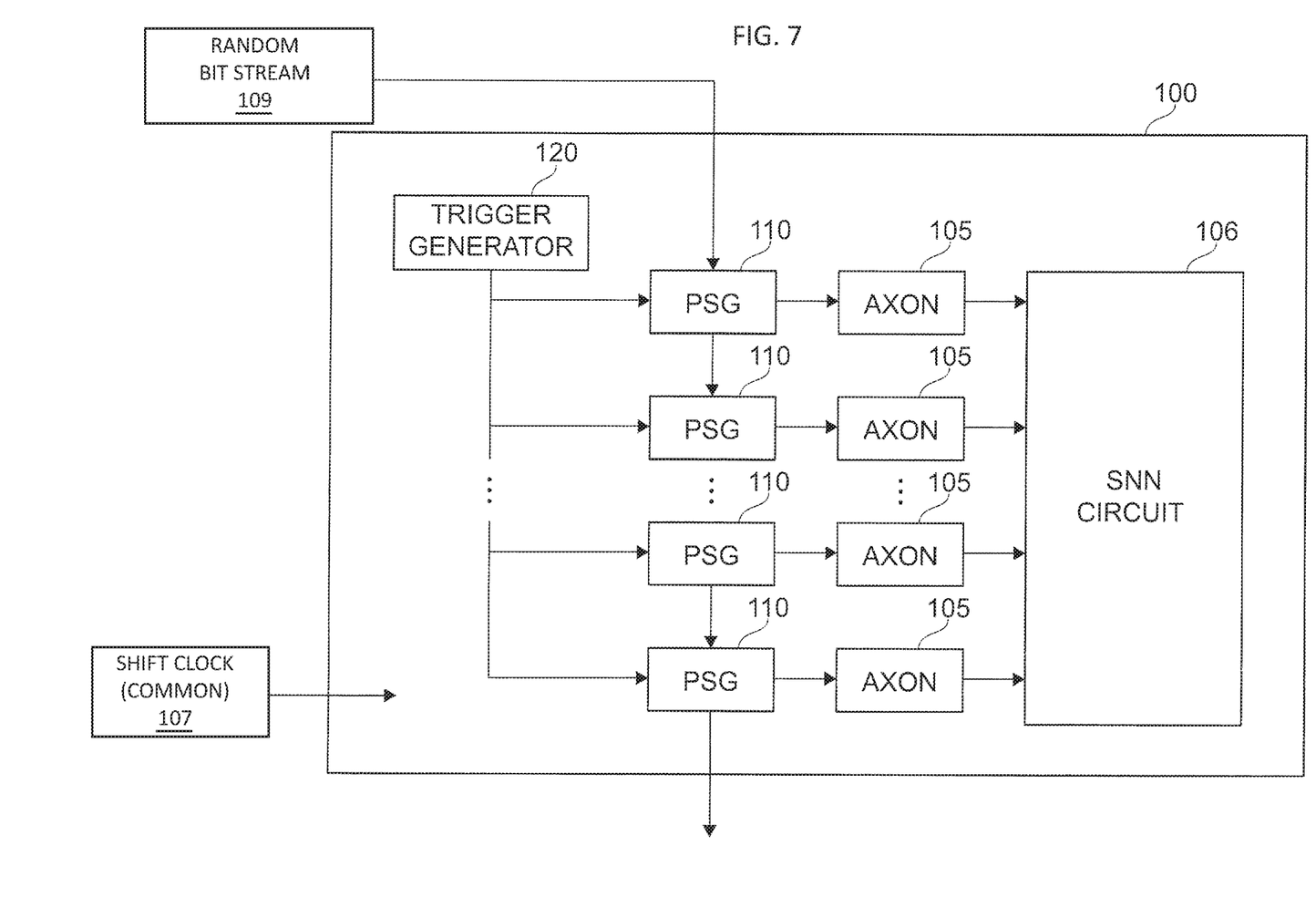
FIG. 7 illustrates the SNN chip according to an embodiment of the present invention.

FIG. 7 illustrates the SNN chip 100 according to the present embodiment.

In the third embodiment, the axon 105, the SNN circuit 106 and the PSG 110 are the same as those of the embodiment explained with reference to FIG. 3. As shown in FIG. 7, in the present embodiment, the SNN chip 100 further includes a trigger generator 120. The trigger generator 120 generates and emits a random Poisson spike train including spikes occurring with a certain probability. This Poisson spike train is the same as the external trigger 108 explained with reference to FIGS. 3 to 5. Accordingly, the probability of a spike occurring is determined based on relationship with the probability of an output spike occurring and the random bit stream 109. For example, when the probability of the signal of the random bit stream 109 being High is 1/N times the required probability E of an output spike being emitted from the PSG 110, the probability of a spike occurring in the Poisson spike train generated by the trigger generator 120 is N times the probability E.

Figure 8:
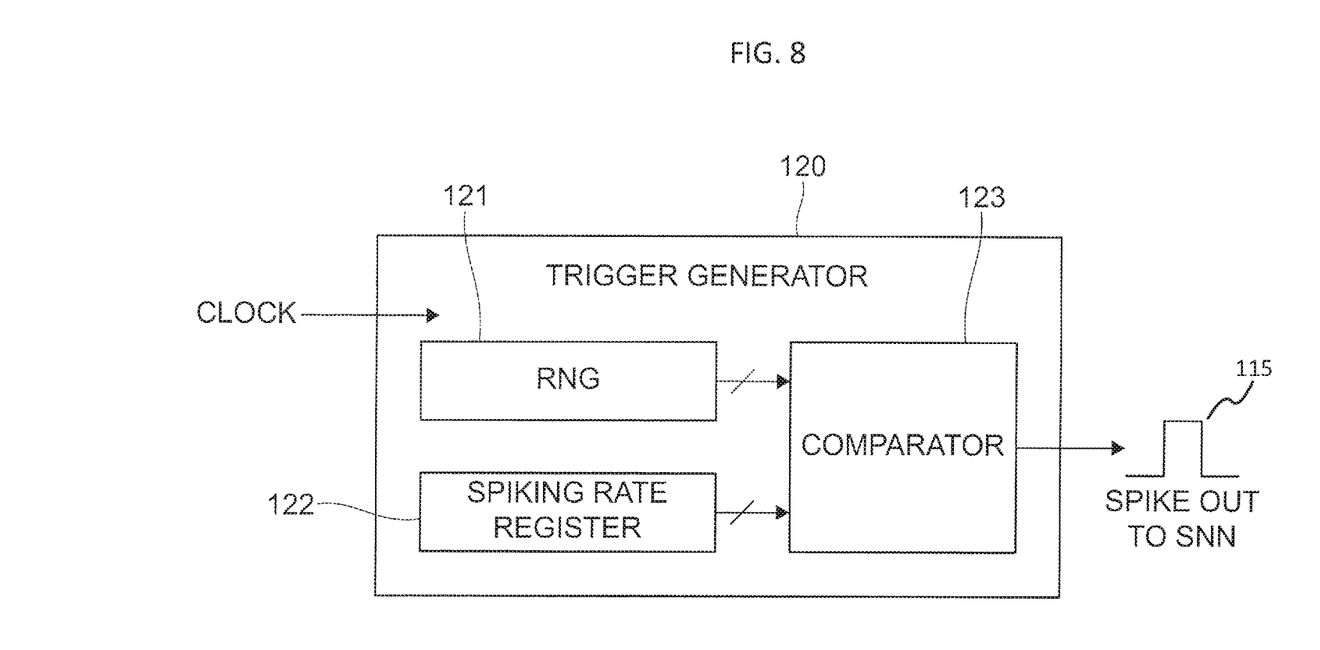
FIG. 8 illustrates an exemplary configuration of a trigger generator.

FIG. 8 illustrates an exemplary configuration of the trigger generator 120.

The trigger generator 120 shown in FIG. 8 includes a random number generator (RNG) 121, a spiking rate register 122, and a comparator 123.

The RNG 121 generates random numbers according to clock signals input to the trigger generator 120. Note that the shift clock 107 driving the shift register 111 of the PSG 110 may be used as the clock signals.

The spiking rate register 122 stores a comparison value to be compared with the random numbers generated by the RNG 121. The comparison value determines the probability of a spike occurring in a Poisson spike train. For example, the comparison value stored in the spiking rate register 122 is set such that a spike is emitted with a probability of N times the required probability E of an output spike 115 being emitted from the PSG 110.

The comparator 123 compares each random number generated by the RNG 121 with the comparison value read from the spiking rate register 122. Based on the comparison result, the comparator 123 emits a spike 115.

In the embodiments described above with reference to FIGS. 3-8, one random bit stream 109 is supplied to each PSG 110 on the SNN chip 100 while being shifted by each shift register 111, and each PSG 110 emits output spikes 115 based on an AND of this random bit stream 109 and the external trigger 108. However, each PSG 110 may emit output spikes 115 based only on the random bit stream 109 shifted by the shift register 111. In this case, for example, the probability of the signal of the random bit stream 109 being High is set to the probability E, which is the same as the required probability E of an output spike 115 being emitted from the PSG 110. Then, each PSG 110 emits output spikes 115 at a timing such as when the random bit stream 109 rises to High. This allows each PSG 110 to emit different output spikes 115 even without the external trigger 108 (or a Poisson spike train corresponding to the external trigger 108). In this case, each PSG 110 does not produce a different random sequence of output spikes 115 because each PSG 110 merely receives the shifted random bit stream 109.

In the embodiments shown in FIGS. 3-8, the PSG 110 includes the shift register 111, which transmits the received random bit stream 109 while shifting it by one clock of the shift clock 107, and the PSGs 110 transfer the random bit stream 109 in a bucket-brigade manner. Alternatively, the SNN chip 100 may be provided with a device that receives the random bit stream 109 from an external source and supplies it to the PSGs 110 one by one while shifting it by one clock of the shift clock 107. This configuration removes the shift register 111 from each PSG 110; each PSG 110 merely calculates an AND of the received random bit stream 109 and the external trigger 108 (or a Poisson spike train corresponding to the external trigger 108) by the AND circuit 112 and emits a spike signal 115.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A spiking neural network device comprising:
a spiking neural network circuit including a crossbar array of a plurality of synapses;
a plurality of axons connected with the spiking neural network circuit, the plurality of axons receiving input of a spike signal; and
a plurality of Poisson spike generators respectively provided for the plurality of axons, each Poisson spike generator being configured to be set whether or not to emit the spike signal based on an input signal to be processed, each Poisson spike generator set to emit the spike signal being configured to generate a Poisson spike train different from each other and supply the Poisson spike train to a corresponding one of the plurality of axons, wherein each Poisson spike generator is configured to receive a random bit stream in turn, the random bit stream being a binary signal whose value becomes High with a certain probability.

2. The spiking neural net k device according to claim 1, Wherein the spiking neural network device comprises an event-driven restricted Boltzmann machine.

3. The spiking neural network device according to claim 1, the random bit stream being input to each Poisson spike generator while being shifted for each Poisson spike generator by one clock of a predetermined clock signal at a time, each Poisson spike generator being configured to generate the Poisson spike train based on the received random bit stream.

4. The spiking neural network device according to claim 3, wherein each Poisson spike generator is configured to receive an external trigger, the external trigger being a random spike train including spikes occurring in a certain probability, each Poisson spike generator being configured to calculate an AND of the received external trigger and the random, bit stream to emit the spike signal.

5. The spiking neural network device according to claim 4, further comprising a trigger generator configured to supply the external trigger to each Poisson spike generator.

6. The spiking neural network device according to claim 5, wherein the trigger generator includes:
a random number generator configured to generate random numbers at certain intervals;
a spiking rate register configured to store a comparison value to be compared with the random numbers generated by the random number generator; and
a comparator configured to compare the random numbers generated by the random number generator with the comparison value read from the spiking rate register, the comparator being configured to output a spike as the external trigger based on a comparison result of the random numbers and the compassion value.

7. The spiking neural network device according to claim 4, wherein the random bit stream is a binary signal whose value becomes High with a probability that is 1/N times a required probability of a spike occurring in the Poisson spike train supplied to the plurality of axons, and
the external trigger is a spike train in which a spike occurs with a probability that is N times the required probability of a spike occurring in the Poisson spike train supplied to the plurality of axons.

8. An on-chip Poisson spike generator of a spiking neural network device, wherein:
the on-chip Poisson spike generator is individually provided for each of a plurality of axons connected with a spiking neural network circuit, the spiking neural network circuit including a crossbar array of a plurality of synapses, the on-chip Poisson spike generator comprises:
an AND circuit configured to receive a random bit stream and an external trigger, the random bit stream being a binary signal whose value becomes High with a certain probability, the external trigger being a random spike train in which a spike occurs with another certain probability different from the certain probability,the AND circuit being configured to generate a spike train; and
an enable register configured to enable the on-chip Poisson spike generator to emit the. spike train generated by the AND circuit or disable the on-chip Poisson spike generator from emitting the spike train, based on an input signal to be processed.

9. The on-chip Poisson spike generator according to claim 8, further comprising a shift register configured to transmit the random bit stream while shifting the random bit stream by one clock of a predetermined clock signal, wherein
the on-chip Poisson spike generator is configured to transfer the random bit stream, which is shifted by the shift register by one clock of the clock signal, in a bucket-brigade manner.

10. A method for emitting a Poisson spike train from a spiking neural network device, the spiking neural network device including:
a spiking neural network circuit including a crossbar array of a plurality of synapses; and
a plurality of Poisson spike generators respectively provided for a plurality of axons connected with the spiking neural network circuit, each Poisson spike generator being configured to generate a Poisson spike train different from each other and supply the Poisson spike train to a corresponding one of the plurality of axons, each. Poisson spike generator being configured to calculate an AND of a random bit stream, which is a random binary signal whose value becomes High at a certain probability, and an external trigger, which is a random spike train in which a spike occurs with a certain probability, to generate the Poisson spike train, each Poisson spike generator including an enable register configured to enable or disable emission of the generated Poisson spike train, the method comprising:

inputting the random bit stream and a shift clock to a shift register of each Poisson spike generator corresponding to one of the plurality of axons one after another, thereby inputting the random bit stream to the shift registers of all Poisson spike generators while shifting the random bit stream by one clock of the shift clock for each Poisson spike generator in order of inputting; and enabling each Poisson spike generator to emit the Poisson spike train or disabling each Poisson spike generator from emitting the Poisson spike train by setting the enable register of each Poisson spike generator based on an input signal pattern.

* * * * *